(12) United States Patent
Baek et al.

(10) Patent No.: US 8,611,345 B2
(45) Date of Patent: Dec. 17, 2013

(54) APPARATUS AND METHOD FOR PROCESSING MULTI-LAYER PACKET

(75) Inventors: Dong Myoung Baek, Daejeon (KR); Bhum Cheol Lee, Daejeon (KR); Jung Hee Lee, Daejeon (KR); Sang Yoon Oh, Daejeon (KR); Seung-Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 285 days.

(21) Appl. No.: 12/903,680

(22) Filed: Oct. 13, 2010

(65) Prior Publication Data

US 2011/0149741 A1 Jun. 23, 2011

(30) Foreign Application Priority Data

Dec. 21, 2009 (KR) .................. 10-2009-0128184

(51) Int. Cl.
*H04L 12/28* (2006.01)

(52) U.S. Cl.
USPC .......................................... 370/389

(58) Field of Classification Search
USPC .................... 370/229–235, 351, 389, 392, 370/395.5–395.52; 709/238–244; 726/22–25

See application file for complete search history.

(56) References Cited

U.S. PATENT DOCUMENTS

| 7,624,436 | B2 * | 11/2009 | Balakrishnan et al. | 726/13 |
| 7,773,510 | B2 * | 8/2010 | Back et al. | 370/230 |
| 2006/0140197 | A1 | 6/2006 | Robinson et al. | |
| 2008/0077705 | A1 | 3/2008 | Li et al. | |
| 2008/0313738 | A1 | 12/2008 | Enderby | |

FOREIGN PATENT DOCUMENTS

| KR | 10-2004-0105602 | 12/2004 |
| KR | 10-2007-0122020 | 12/2008 |

* cited by examiner

*Primary Examiner* — Frank Duong
(74) *Attorney, Agent, or Firm* — Staas & Halsey LLP

(57) ABSTRACT

Provided is an apparatus and method for inspecting a multi-layer packet. The apparatus may include a lower layer processing unit to generate lower layer hash information based on a lower layer packet of the multi-layer packet, and to perform a first processing with respect to a flow of the multi-layer packet, in association with the generated lower layer hash information, and a higher layer preprocessing unit to perform a second processing with respect to a flow of the multi-layer packet where the first processing is performed, in association with the lower layer hash information.

12 Claims, 6 Drawing Sheets

APPARATUS AND METHOD FOR PROCESSING MULTI-LAYER PACKET

CROSS-REFERENCE TO RELATED APPLICATION

This application claims the priority benefit of Korean Patent Application No. 10-2009-0128184, filed on Dec. 21, 2009, in the Korean Intellectual Property Office, the disclosure of which is incorporated herein by reference.

BACKGROUND

1. Field

One or more embodiments relate to an apparatus and method for inspecting a multi-layer packet, and more particularly, to an apparatus and method for inspecting a multi-layer packet, which may effectively perform a multi-layer processing with respect to a multi-layer packet flow using attributes between the multiple layers.

2. Description of the Related Art

As a hierarchy of a protocol, an open systems interconnection (OSI) layer 7 model may be widely used. Here, an Internet protocol stack may include layers 2 to 4 and a layer 7, and thereby may be configured of 4 layers. The layers 2 to 4 may be layers determined based on a data transfer scheme, the layer 2 may be configured of an Ethernet protocol, and a layer 3 and a layer 4 may be configured of an Internet protocol.

The layers 2 to 4 may process a frame or a packet using an exclusive hardware or a network processor, and a processing performance of the layers 2 to 4 may be an important issue. The layer 7 may be an application layer where various services are loaded, and flexibility of the layer 7 may be an important issue.

Along with crucial integration/convergence and a multi-core processor for a variety of data transfer schemes, an effective processing for the layer 2 to the layer 7 may be required due to demands for development in a processing capability and for high efficiency.

Specifically, a processing for the layer 2 to the layer 7 may be required to be performed at the time of inspection of a packet. In this instance, when the processing is performed in an existing scheme, the layer 2 to the layer 4, that is, lower layers of which a performance is an important issue, and the layer 7, that is, a higher layer of which flexibility is an important issue, may conflict with each other so that one of the performance and the flexibility may disadvantageously need to be selected.

Accordingly, there has been suggested a packet processing method that may process the layer 2 to the layer 4 while improving the performance of the layer 7 using, in the layer 7, information having been processed in the layer 2 to the layer 4 by transferring the information, and thereby may acquire the flexibility of the layer 7 while maintaining the performance of the layer 2 to the layer 4. The packet processing method may have an advantage in that the performance processed in the layer 7 may be improved and the processing for the layer 2 and the layer 3 may be performed regardless of the layer 7. However, at the time of inspection of the packet or associative operation of a different network, an integrated processing performance for the layer 2 to the layer 4 and the layer 7 may be still be deteriorated due to a performance difference between the layer 2 to the layer 4 and the layer 7.

Also, there has been suggested a packet processing method that may configure the packet processing in a multi-step manner to enable a unique function for each step to be performed, so that the layer 2 to the layer 7 are integrated and processed by a simple structure.

The immediately above packet processing method may simply perform an integrated processing with respect to the layer 2 to the layer 7, and classify and process packets of which a processing is required to be performed in the layer 7. However, the unique function of each step may not be classified for each layer, so that flexibility in each layer may be deteriorated. Also, an associative operation between the lower layers (the layer 2 to the layer 4) and the upper layer (the layer 7) may not be realized, and thereby higher layer information may not be utilized in the lower layer.

SUMMARY

One or more embodiments provide an apparatus and method for inspecting a multi-layer packet that may transfer, to lower layers (layers 2 to 4), information where an Internet Protocol (IP) packet flow is processed in a higher layer, and may effectively process the IP packet flow using the information processed in the higher layer (layer 7), and thereby may support performance of the lower layers and flexibility of the higher layer.

According to an aspect of one or more embodiments, there may be provided an apparatus for inspecting a multi-layer packet, the apparatus including: a lower layer processing unit to generate lower layer hash information based on a lower layer packet of the multi-layer packet, and to perform a first processing with respect to a flow of the multi-layer packet, in association with the generated lower layer hash information; and a higher layer preprocessing unit to perform a second processing with respect to a flow of the multi-layer packet where the first processing is performed, in association with the lower layer hash information.

The lower layer processing unit may identify, from a first database, lower layer processing information recorded to correspond to the lower layer hash information, and perform the first processing using the identified lower layer processing information.

The higher layer preprocessing unit may identify, from a second database, the higher layer processing information recorded to correspond to the lower layer hash information, and perform the second processing using the identified higher layer processing information.

The apparatus may further include a higher layer processing unit to receive, from the higher layer preprocessing unit, the multi-layer packet where the first processing is performed when the second processing is impossible to be performed by the higher layer preprocessing unit.

The higher layer processing unit may generate higher layer hash information based on a higher layer packet of the multi-layer packet where the first processing is performed, and perform the second processing using the higher layer processing information corresponding to the generated higher layer hash information.

The higher layer processing unit may generate the higher layer hash information based on the higher layer packet of the multi-layer packet where the first processing is performed, and transmits, to the higher layer preprocessing unit, the higher layer processing information corresponding to the generated higher layer hash information, and the higher layer preprocessing unit may record the received higher layer processing information in the second database.

The lower layer processing unit may perform the first processing using the lower layer processing information for a layer 2 packet to a layer 4 packet from among Open System Interconnection (OSI) layer 7 packets.

The higher layer preprocessing unit may perform the second processing using higher layer processing information for a layer 7 packet from among OSI layer 7 packets.

According to another aspect of one or more embodiments, there may be provided a method for inspecting a multi-layer packet, the method including: generating lower layer hash information based on a lower layer packet of a multi-layer packet; performing a first processing with respect to a flow of the multi-layer packet, in association with the generated lower layer hash information; and performing a second processing with respect to the flow of the multi-layer packet where the first processing is performed, in association with the lower layer hash information.

The performing of the first processing may include identifying, from a first database, lower layer processing information recorded to correspond to the lower layer hash information, and performing the first processing using the identified lower layer processing information.

The performing of the second processing may include identifying, from a second database, higher layer processing information recorded to correspond to the lower layer hash information, and performing the second processing using the identified higher layer processing information.

The performing of the second processing may include generating higher layer hash information based on a higher layer packet of the multi-layer packet where the first processing is performed when the second processing is impossible to be performed; and performing the second processing using higher layer processing information corresponding to the generated higher layer hash information.

The performing of the first processing may include performing the first processing using lower layer processing information for a layer 2 packet to a layer 4 packet from among the OSI layer 7 packets.

Additional aspects of embodiments will be set forth in part in the description which follows and, in part, will be apparent from the description, or may be learned by practice of the disclosure.

EFFECT

According to embodiments, there is provided an apparatus and method for inspecting a multi-layer packet that may transfer, to lower layers (2 layer to 4 layer), information where an Internet Protocol (IP) packet flow is processed in a higher layer, and effectively process the IP packet flow using the information processed in the higher layer (7 layer), and thereby may support performance of the lower layers and flexibility of the higher layer.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
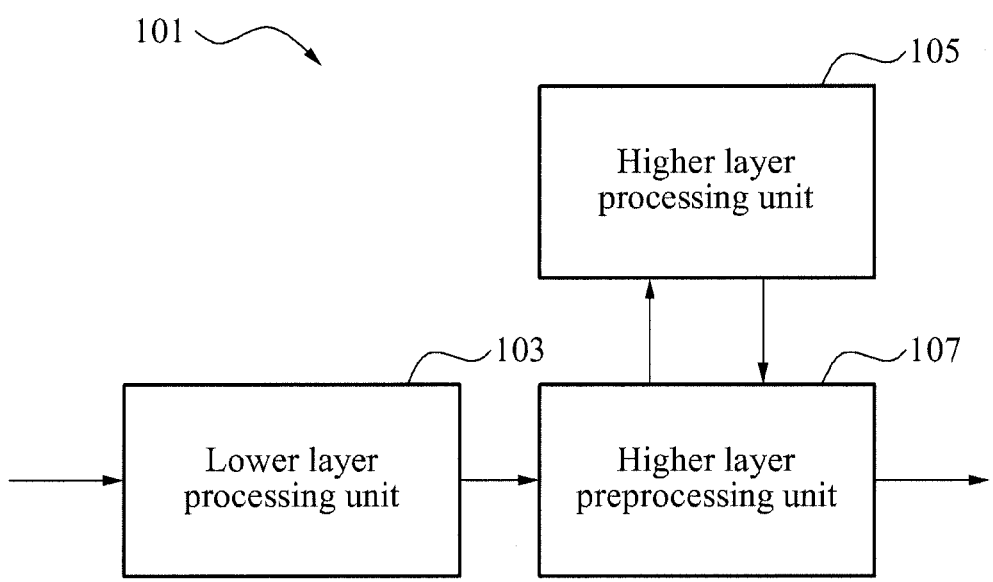
FIGS. 1 to 3 and FIG. 5 are diagrams illustrating a configuration of an apparatus of inspecting a multi-layer packet according to embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 is a diagram illustrating a configuration of an apparatus 101 for inspecting a multi-layer packet according to an embodiment.

Referring to FIG. 1, the apparatus 101 includes a lower layer processing unit 103, a higher layer processing unit 105, and a higher layer preprocessing unit 107.

The lower layer processing unit 103 may generate hash information of a lower layer using information within an Internet Protocol (IP) packet of a lower layer with respect to an input IP packet and a classification rule, may classify IP packets, and may manage a state of the classified IP packets to generate a flow, which is referred to as a shallow classification.

The higher layer processing unit 105 may deep classify the flow generated in the lower layer processing unit 103 using higher layer information of the flow and a policy or a rule, and a deep classification rule, classification information, and an action rule of the deep classified flow may be outputted together with shallow classification information of the lower layer of the flow.

The higher layer preprocessing unit 107 may verify a deep classification rule of the higher layer corresponding to the shallow classification information of a corresponding lower layer with respect to the flow inputted from the lower layer processing unit 103, and transfer the inputted flow and the shallow classification information to the higher layer processing unit, when the flow fails to be classified based on the deep classification rule regardless of presence/absence of deep classification rule information of the higher layer corresponding to the shallow classification information of the lower layer of a corresponding flow based on the verified result.

The higher layer preprocessing unit 107 may process the flow based on a corresponding action rule received in the higher layer processing unit when the deep classification rule information of the higher layer corresponding to the shallow classification information of the lower layer of a corresponding flow based on the verified result.

Unlike using the information where the IP packet is processed in the lower layer when processing the IP packet flow by the upper layer in a conventional hierarchy structure, in the apparatus for inspecting the multi-layer packet according to an embodiment, the higher layer preprocessing unit 107 may process the IP packet using processing information of the flow obtained by processing the IP packet in the higher layer processing unit 105, so that an integrated processing performance for a layer 2 to a layer 7 may coincide with a performance of each of the lower layer processing unit 103 and the upper layer preprocessing unit 107.

Figure 2:
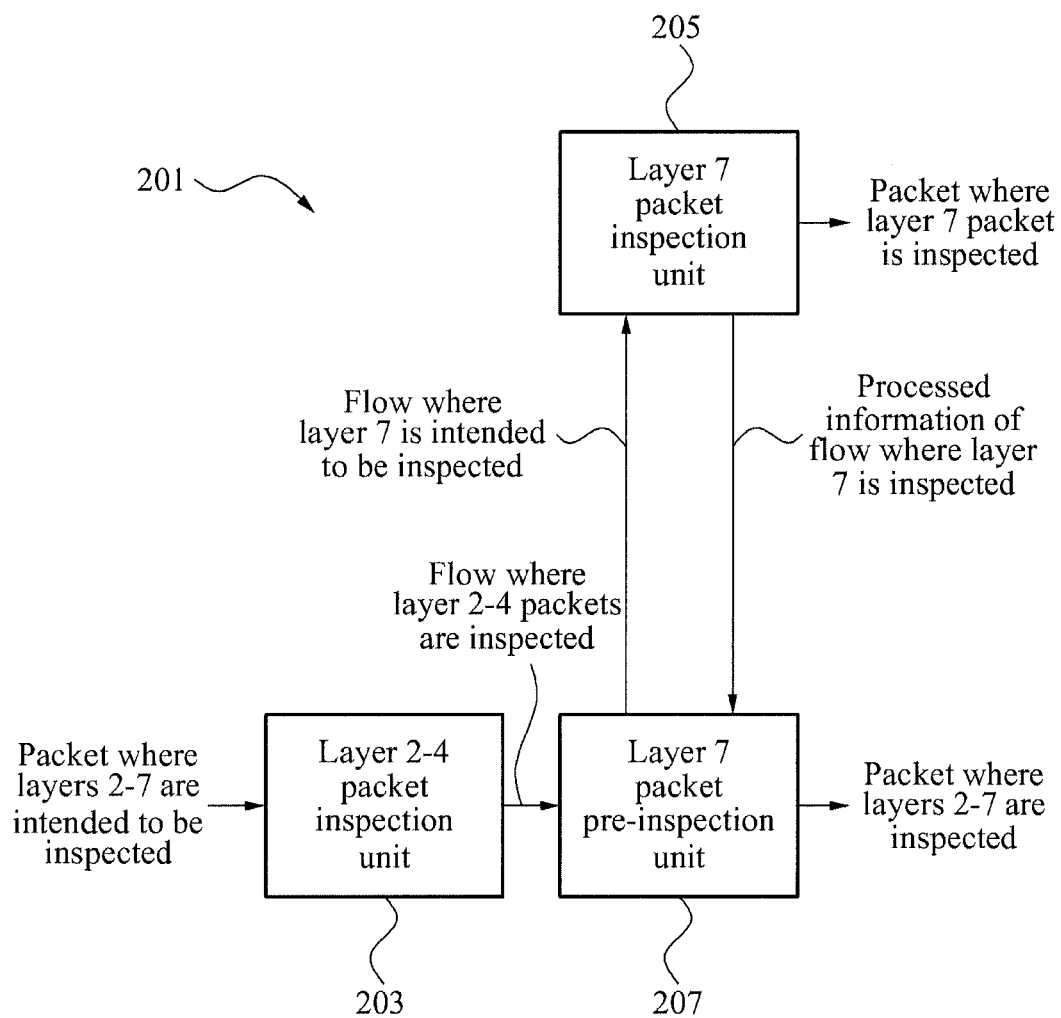

FIG. 2 is a diagram illustrating a configuration of an apparatus 201 for inspecting a multi-layer packet according to another embodiment.

Referring to FIG. 2, the apparatus 201 includes a layer 2-4 packet inspection unit 203, a layer 7 packet inspection unit 205, and a layer 7 packet pre-inspection unit 207.

The layer 2-4 packet inspection unit 203 may classify IP packets using packet information and a classification policy or rule of the layers 2 to 4 when the IP packets are inputted, and manage a state of the flow.

The layer 7 packet inspection unit 205 may generate a hash of the layer 7 using layer 7 information and a layer 7 policy and rule with respect to the flow generated and transferred in the layer 2-4 packet inspection unit 203, and classify the flow based on the layer 7. The layer 7 packet inspection unit 205 may output a classification rule of the layer 7 of the classified flow and an action rule of the layer 7 to the layer 7 packet pre-inspection unit 207, together with hash information of the layers 2 to 4 of the flow.

The layer 7 packet pre-inspection unit 207 may verify presence/absence of the classification rule of the layer 7 corresponding to the hash information of the layers 2 to 4 of the flow inputted from the layer 2-4 packet inspection unit 203.

The layer 7 packet pre-inspection unit 207 may transfer, to the layer 7 packet inspection unit 205, the inputted flow and the hash information of the layers 2 to 4, when the flow fails to be classified based on the classification rule of the layer 7 regardless of presence/absence of the classification rule information of the layer 7 corresponding to the hash information of the layers 2 to 4 of a corresponding flow based on the verified result.

When the flow is classified based on the classification rule of the layer 7 while the classification rule information of the layer 7 corresponding to the hash information of the layers 2 to 4 of a corresponding flow is exists based on the verified result of the layer 7 packet pre-inspection unit 207, the flow may be processed based on the action rule of the corresponding layer 7 received in the layer 7 packet inspection unit 205.

Figure 3:
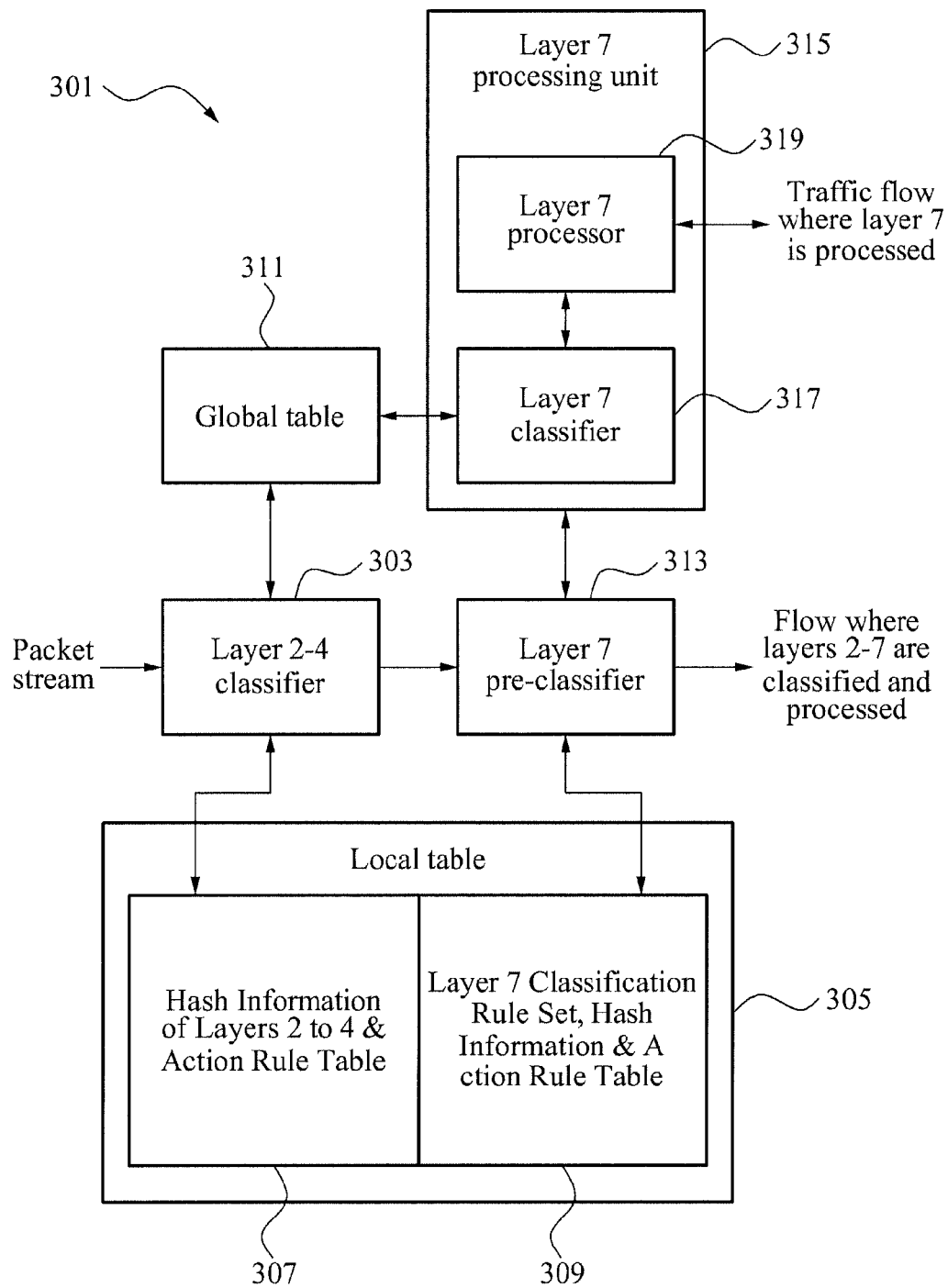

FIG. 3 is a diagram illustrating a configuration of an apparatus 301 for inspecting a multi-layer packet according to another embodiment.

Referring to FIG. 3, the apparatus 301 includes a layer 2-4 classification unit 303, a local table 305, a global table 311, a layer 7 preprocessing unit 313, and a layer 7 processing unit 315.

When an IP packet stream is inputted, the layer 2-4 classification unit 303 may generate hash information of the layers 2 to 4 using information of the layers 2 to 4 and an IP packet classification rule or policy of the layers 2 to 4. Next, the layer 2-4 classification unit 303 may classify packets using the hash information of the layers 2 to 4 and an action rule table 307 to generate a flow, and transmit, to the layer 7 preprocessing unit 313, the generated flow together with the hash information of the layer 2 to 4.

The local table 305 may include the hash information of the layers 2 to 4 and the action rule table 307, the layer 7 classification rule set, and a hash information and action rule table 309.

The global table 311 may be configured of classification information about the layer 7 based flow.

The layer 7 preprocessing unit 313 may verify presence/absence of the layer 7 classification rule in the layer 7 classification rule and the hash information and action rule table 309, using the flow received from the layer 2-4 classifier and the layer 2-4 hash information.

The layer 7 preprocessing unit 313 may transfer, to a layer 7 packet classifier 317, an inputted flow and the layer 2-4 hash information, when the flow fails to be classified based on a classifier rule of the layer 7 transferred from the layer 7 classifier 317 regardless of presence/absence of the classification rule information of the layer 7 corresponding to the hash information of the layers 2 to 4 of the inputted flow based on the verified result of the presence/absence of the layer 7 classification rule.

The layer 7 pre-classifier 313 may process the flow based on the layer 7 classification rule and an action rule of the hash information and action rule table 903, when the flow is classified based on the layer 7 classification rule while the classification rule information of the layer 7 corresponding to the hash information of the layers 2 to 4 of the inputted flow is present based on the verified result of the presence/absence of the layer 7 classification rule.

The layer 7 classification rule and the action rule of the hash information and action rule table 309 may initially or intermittently set or update the layer 7 classification rule, and thereby an inspection may be primarily performed based on the classification rule information of the layer 7 corresponding to the hash information of the layers 2 to 4 of the flow inputted in the layer 7 pre-classifier 313 to thereby improve performance.

The layer 7 processing unit 315 may include a layer 7 classifier 317 and a layer 7 processor 319.

The layer 7 classifier 317 may include layer 7 hash information of the flow using the layer 7 policy or rule existing within the layer 7 classifier 317 with respect to the layer 7 information of the flow transmitted from the layer 7 pre-classifier 313.

The flow may be classified according to the layer 7 based flow as a corresponding information in the global table 311 from the layer 7 hash information, and output, to the layer 7 pre-classifier 313, the classification rule of the layer 7 of the classified layer 7 based flow, the hash information of the layer 7, an action rule of the layer 7 together with the hash information of the layers 2 to 4.

To improve a processing performance, the layer 7 classifier 317 may arrange, in a cache memory of the layer 7 processing unit 315, the classification rule of the layer 7 and the hash information and action rule of the layer 7 obtained from the global table 311, and may first access the memory.

The layer 7 processor 319 may directly output the flow classified from the layer 7 classifier by processing the layer 7 classifier 317, and directly utilize an application field.

Figure 4:
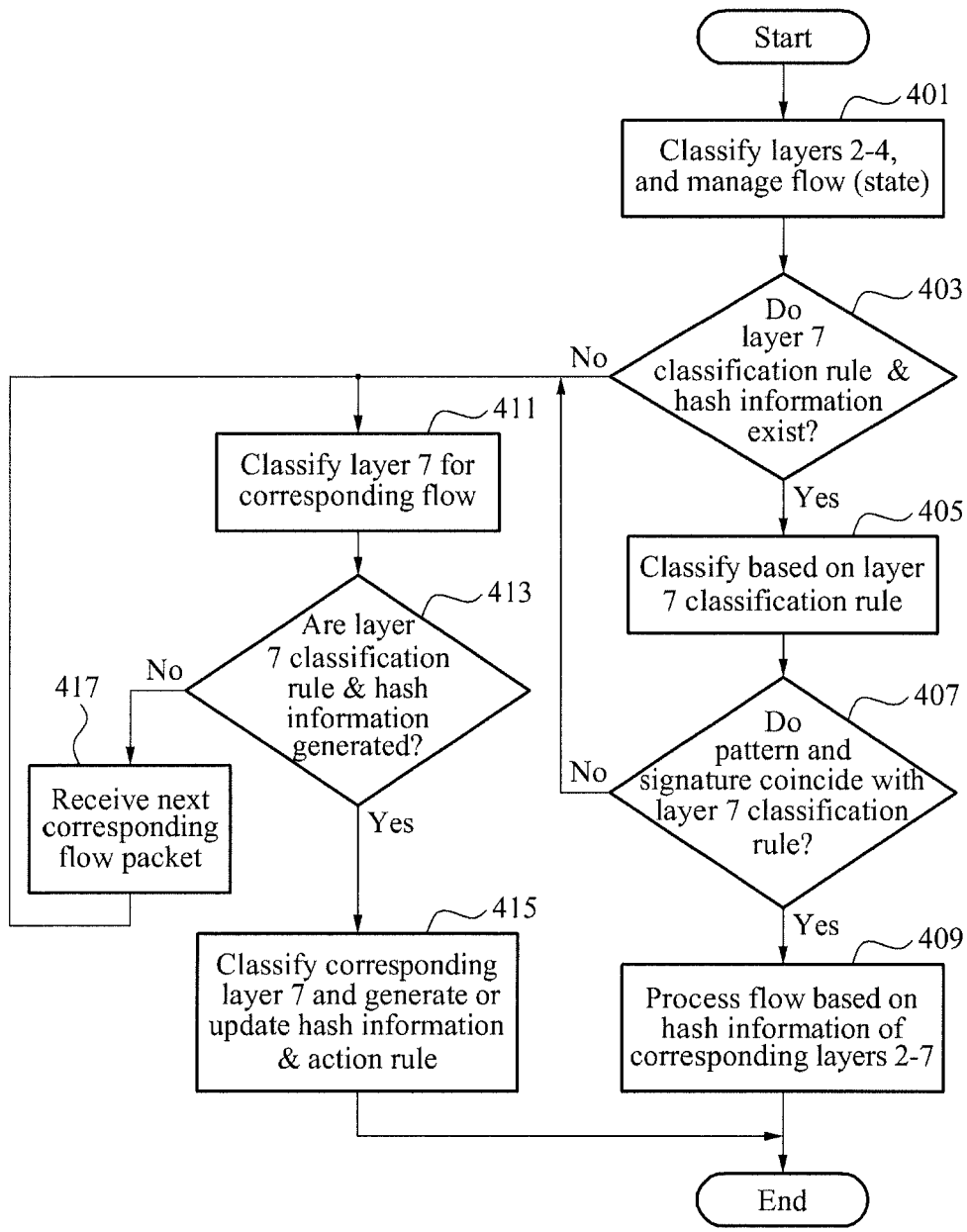
FIGS. 4 and 6 are flowchart illustrating a method for inspecting a multi-layer packet according to embodiments.

FIG. 4 is a diagram illustrating a method for inspecting a multi-layer packet according to an embodiment.

In operation 401, the method may classify inputted IP packets using information about layers 2 to 4 and a policy or rule of the layers 2 to 4 to generate a flow, and manage a state of the flow.

In operation 403, the method may verify whether a layer 7 classification rule and hash information exists in the flow obtained in operation 401.

Specifically, in operation 403, the method may initially or intermittently set or update the layer 7 classification rule and hash information to thereby improve layer 7 processing performance.

In operation 405, when the layer 7 classification rule and hash information with respect to a corresponding flow is present based on the verification result, the method may classify the flow based on the layer 7 classification rule.

In operation 407, the method may verify at least one of a pattern and a signature of the corresponding flow based on the layer 7 classification rule to check whether the verified at least one of the pattern and the signature and the layer 7 classification rule coincide with each other.

In operation 409, when the layer 7 classification rule verified in operation 407 coincides with the verified at least one of the pattern and the signature, the method may process the corresponding flow in accordance with an action rule based on hash information of corresponding layers 2 to 4 and 7.

In operation 411, when the layer 7 classification rule and hash information of the corresponding flow is absent based on the verified result of operation 403, the method may perform a layer 7 classification with respect to the corresponding flow. Operation 411 may be performed in the layer 7 classifier of FIG. 4.

When the layer 7 classification rule does not coincide with the verified at least one of the pattern and the signature, the method may perform operation 411 in the layer 7 classifier of FIG. 4.

In operation 413, the method may determine whether to generate the layer 7 classification rule and hash information and an action rule of the flow classified in operation 411.

In operation 415, when the layer 7 classification rule and hash information and the action rule are generated in operation 413, the method may generate or update the corresponding layer 7 classification and hash information and an action rule table of the corresponding flow. Operation 415 may be performed in the local table.

In operation 417, when the layer 7 classification rule and hash information and the action rule are not generated in operation 413, the method may perform a layer 7 re-classification with respect to the corresponding flow. Operation 417 may be performed in a case of using a cache memory, when information is obtained from the global table or when a processing error occurs.

Figure 5:
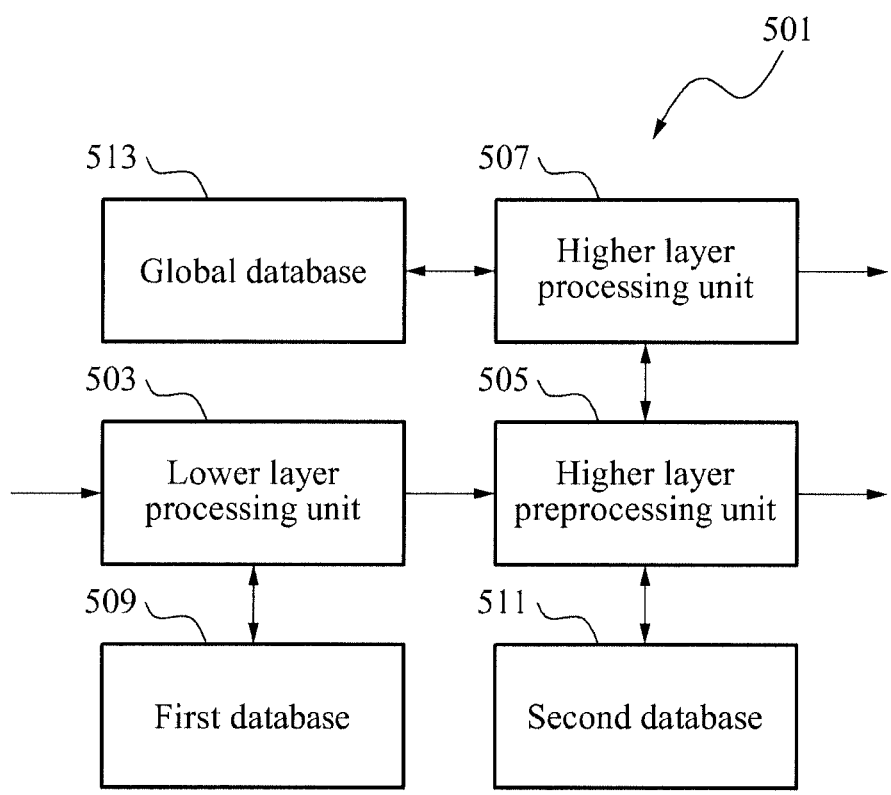

FIG. 5 is a diagram illustrating a configuration of an apparatus 501 for inspecting a multi-layer packet according to another embodiment.

Referring to FIG. 5, the apparatus 501 includes a lower layer processing unit 503, a higher layer preprocessing unit 505, a higher layer processing unit 507, a first database 509, a second database 511, and a global database 513.

The lower layer processing unit 503 may generate hash information of a lower layer based on a lower layer packet of a multi-layer packet, and perform a first processing with respect to a flow of the multi-layer packet, in association with the generated hash information of the lower layer.

In this instance, the lower layer processing unit 503 may generate hash information for layers 2 to 4, based on layers 2 to 4 packets from among from among Open System Interconnection (OSI) layer 7 packets and based on a predetermined lower classification rule.

Here, the lower layer processing unit 503 may identify, from the first database 509, processing information of the lower layer recorded to correspond to lower layer hash information, and perform the first processing with respect to the flow of the multi-layer packet. Here, the lower layer processing information may be processing information for the layers 2 to 4 packets from among the OSI layer 7 packets.

The higher layer preprocessing unit 505 may perform a second processing with respect to a flow of the multi-layer packet where the first processing is performed, in association with the lower layer hash information. In this instance, the higher layer preprocessing unit 505 may identify, from a second database, the higher layer processing information recorded to correspond to the lower layer hash information, and perform the second processing using the identified higher layer processing information.

Here, the higher layer processing information may be processing information for the layer 7 packet from among the OSI layer 7 packets.

When the higher layer processing information corresponding to the lower layer hash information does not exist in the second database 511, or when the second processing is impossible to be performed with respect to the flow of the multi-layer packet where the first processing is performed, the higher layer preprocessing unit 505 may transfer, to the higher layer processing unit 507, the multi-layer packet where the first processing is performed.

In this instance, the higher layer preprocessing unit 505 may transfer, to the higher layer processing unit 507, the lower layer hash information together with the multi-layer packet where the first processing is performed.

The higher layer processing unit 507 may generate higher layer hash information based on the multi-layer packet where the first processing is performed, and perform the second processing with respect to a flow of the multi-layer packet whether the first processing is performed, using the higher layer processing information corresponding to the generated higher layer hash information.

In this instance, the higher layer processing unit 507 may generate hash information for the layer 7 based on the layer 7 of the OSI 7 layers and a predetermined higher layer classification rule.

Here, the higher layer processing unit 507 may identify, from the global database 513, the higher layer processing information corresponding to the higher layer hash information.

Also, the higher layer processing unit 507 may transfer, to the higher layer preprocessing unit 505, the higher layer processing information corresponding to the higher layer hash information together with the lower layer hash information.

In this instance, the higher layer preprocessing unit 505 may record, in the second database 511, the lower layer hash information and the higher layer processing information, and update the higher layer processing information stored in the second database 511.

The first database 509 may record the lower layer processing information corresponding to the lower layer hash information, and transfer, to the lower layer processing unit 503, the lower layer processing information in response to a request of the lower layer processing unit 503. In this instance, the first database 509 may record the lower layer processing information for the layers 2 to 4 packets from among the OSI layer 7 packets.

The second database 511 may record the higher layer processing information corresponding to the lower layer hash information, and transfer, to the higher layer preprocessing unit 505, the higher layer processing information in response to a request of the higher layer preprocessing unit 505. In this instance, the second database 511 may record the higher layer processing information for the layer 7 packet from among the OSI layer 7 packets.

The global database 513 may record the higher layer processing information corresponding to the higher layer hash information, and transfer, to the higher layer processing unit 507, the higher layer processing information in response to a request of the higher layer processing unit 507.

Figure 6:
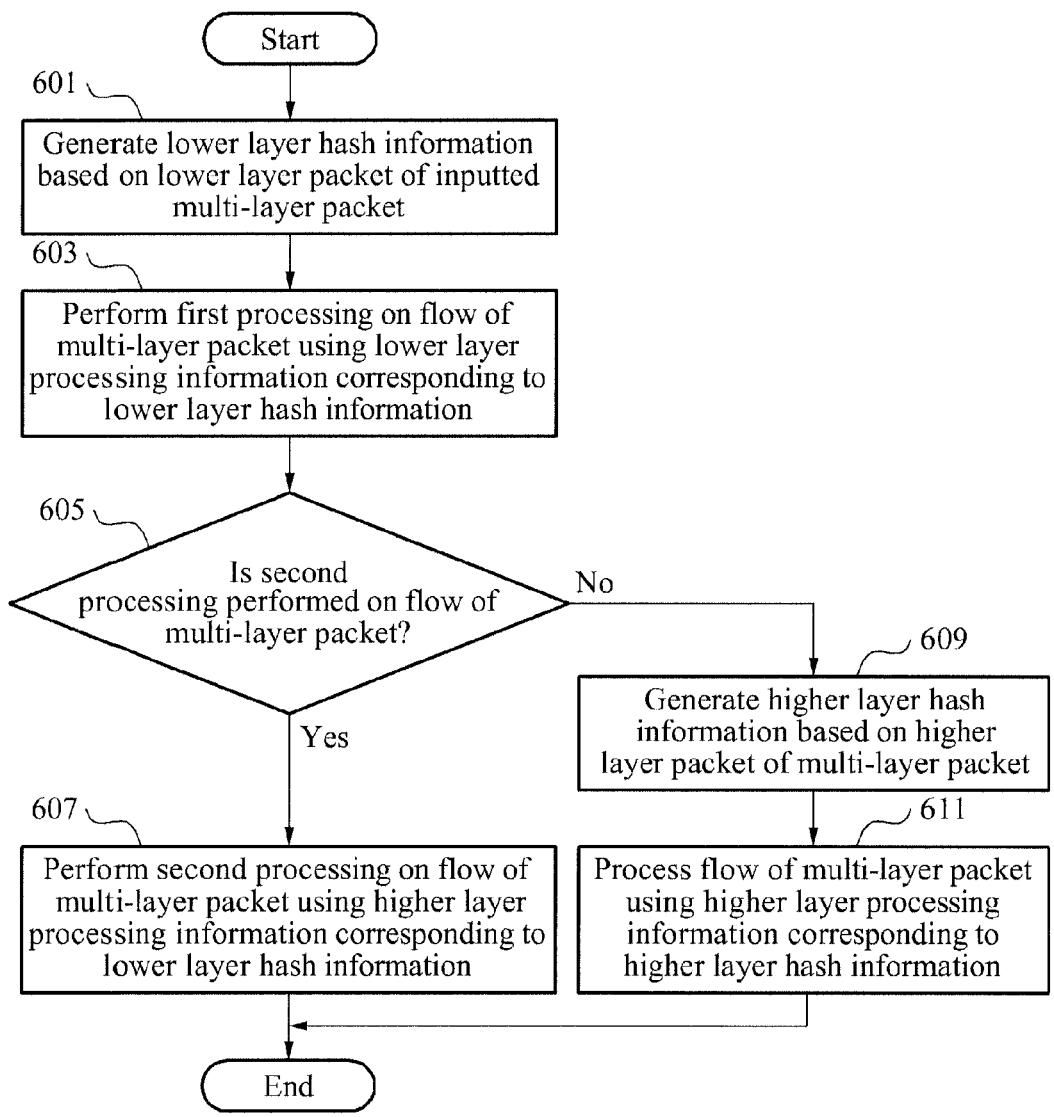

FIG. 6 is a flowchart illustrating a method for inspecting a multi-layer packet according to an embodiment.

Referring to FIG. 6, in operation 601, the apparatus for inspecting the multi-layer packet may generate lower layer hash information based on a lower layer packet of the multi-layer packet.

In this instance, the apparatus may generate hash information for layers 2 to 4 based on layers 2 to 4 packets from among OSI layer 7 packets and a predetermined lower layer classification rule.

In operation 603, the apparatus may perform a first processing with respect to a flow of the multi-layer packet, in association with lower layer hash information.

In this instance, the apparatus may identify, from the first database, lower layer processing information recorded to correspond to the lower layer hash information, and perform a first processing with respect to the flow of the multi-layer packet using the identified lower layer processing information.

Here, the lower layer processing information may be processing information for layer 2 to 4 packets from among the OSI layer 7 packets.

In operation 605, the apparatus may verify whether higher layer processing information corresponding to the lower layer hash information exist in the second database, or whether the second processing is possible to be performed with respect to the flow of the multi-layer packet where the first processing is performed.

In operation 607, when the higher layer processing information corresponding to the lower layer hash information exists in the second database, or when the second processing is possible to be performed with respect to the flow of the multi-layer packet where the first processing is performed, the apparatus may identify the higher layer processing information from the second database, and perform the second processing with respect to the flow of the multi-layer packet where the first processing is performed.

Here, the higher layer processing information may be processing information for the layer 7 packet from among the OSI layer 7 packets.

In operation 609, when the higher layer processing information corresponding to the lower layer hash information does not exist in the second database, or when the second processing is impossible to be performed with respect to the flow of the multi-layer packet where the first processing is performed, the apparatus may generate higher layer hash information based on the higher layer packet of the multi-layer packet where the first processing is performed.

In this instance, the apparatus may generate hash information for the layer 7 based on the layer 7 from among the OSI 7 layers and a predetermined higher layer classification rule.

In operation 611, the apparatus may perform the second processing with respect to the flow of the multi-layer packet where the first processing is performed, using the higher layer processing information corresponding to the higher layer hash information.

In this instance, the apparatus may identify, from the global database, the higher layer processing information corresponding to the higher layer hash information, record, in the second database, the higher layer processing information corresponding to the higher layer hash information together with the lower layer hash information, and update the higher layer processing information stored in the second database.

According to embodiments, the first processing may be performed with respect to the flow of the multi-layer packet using the lower layer processing information, and the second processing may be performed with respect to the flow of the multi-layer packet where the first processing is performed, thereby improving a performance of the lower layer, and obtaining flexibility of the higher layer.

The methods according to the above-described embodiments may be recorded in non-transitory computer-readable storage media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for inspecting a multi-layer packet, the apparatus comprising:
a lower layer processing unit to generate lower layer hash information based on a lower layer packet of the multi-layer packet, and to perform a first processing with respect to a flow of the multi-layer packet, in association with the generated lower layer hash information;
a higher layer preprocessing unit to perform a second processing with respect to a flow of the multi-layer packet where the first processing is performed, in association with the lower layer hash information; and
a higher layer processing unit to receive, from the higher layer preprocessing unit, the multi-layer packet where the first processing is performed only when the second processing is impossible to be performed by the higher layer preprocessing unit.

2. The apparatus of claim 1, wherein the lower layer processing unit identifies, from a first database, lower layer processing information recorded to correspond to the lower layer hash information, and performs the first processing using the identified lower layer processing information.

3. The apparatus of claim 1, wherein the higher layer preprocessing unit identifies, from a second database, the higher layer processing information recorded to correspond to the lower layer hash information, and performs the second processing using the identified higher layer processing information.

4. The apparatus of claim 1, wherein the higher layer processing unit generates higher layer hash information based on a higher layer packet of the multi-layer packet where the first processing is performed, and performs the second processing using the higher layer processing information corresponding to the generated higher layer hash information.

5. The apparatus of claim 1, wherein the higher layer processing unit generates the higher layer hash information based on the higher layer packet of the multi-layer packet where the first processing is performed, and transmits, to the higher layer preprocessing unit, the higher layer processing information corresponding to the generated higher layer hash information, and the higher layer preprocessing unit records the received higher layer processing information in the second database.

6. The apparatus of claim 1, wherein the lower layer processing unit performs the first processing using the lower layer processing information for a layer 2 packet to a layer 4 packet from among Open System Interconnection (OSI) layer 7 packets.

7. The apparatus of claim 1, wherein the higher layer preprocessing unit performs the second processing using higher layer processing information for a layer 7 packet from among OSI layer 7 packets.

8. A method for inspecting a multi-layer packet, the method comprising:
one or more processors configured to perform a process including:
generating lower layer hash information based on a lower layer packet of a multi-layer packet;
performing a first processing with respect to a flow of the multi-layer packet, in association with the generated lower layer hash information;

performing a second processing with respect to the flow of the multi-layer packet where the first processing is performed, in association with the lower layer hash information;

generating higher layer hash information based on a higher layer packet of the multi-layer packet where the first processing is performed only when the second processing is impossible to be performed; and performing the second processing using higher layer processing information corresponding to the generated higher layer hash information.

9. The method of claim 8, wherein the performing of the first processing comprises:

identifying, from a first database, lower layer processing information recorded to correspond to the lower layer hash information, and performing the first processing using the identified lower layer processing information.

10. The method of claim 8, wherein the performing of the second processing comprises:

identifying, from a second database, higher layer processing information recorded to correspond to the lower layer hash information, and performing the second processing using the identified higher layer processing information.

11. The method of claim 8, wherein the performing of the first processing comprises:

performing the first processing using lower layer processing information for a layer 2 packet to a layer 4 packet from among the OSI layer 7 packets.

12. The method of claim 8, wherein the performing of the second processing comprises:

performing the second processing using higher layer processing information for a layer 7 packet from among the OSI layer 7 packets.

* * * * *